United States Patent
Berscheid et al.

(10) Patent No.: US 8,755,462 B2
(45) Date of Patent: Jun. 17, 2014

(54) FREQUENCY OFFSET ESTIMATOR FOR UPSTREAM CABLE SIGNALS

(75) Inventors: Brian Berscheid, Saskatoon (CA); Eric Salt, Saskatoon (CA); Ha Nguyen, Victoria (CA)

(73) Assignee: Vecima Networks Inc., Victoria, B.C. (CA)

( * ) Notice: Subject to any disclaimer, the term of this patent is extended or adjusted under 35 U.S.C. 154(b) by 491 days.

(21) Appl. No.: 13/228,037

(22) Filed: Sep. 8, 2011

(65) Prior Publication Data

US 2012/0069916 A1 Mar. 22, 2012

Related U.S. Application Data

(60) Provisional application No. 61/383,810, filed on Sep. 17, 2010.

(51) Int. Cl.
*H04L 27/36* (2006.01)
*H04M 9/00* (2006.01)

(52) U.S. Cl.
USPC ............................ 375/316; 375/326; 455/402

(58) Field of Classification Search
CPC ............ H04B 1/7087; H04L 2027/003; H04L 2027/0065; H04L 2027/0067; H04L 7/0054; H04L 7/042; H04L 7/0994; H04L 7/113; H04L 27/0014; H04L 7/10
See application file for complete search history.

(56) References Cited

U.S. PATENT DOCUMENTS

| 6,038,267 A * | 3/2000 | Oura et al. ..................... 375/329 |
| 7,492,836 B2 * | 2/2009 | Mizukami ..................... 375/323 |
| 2006/0200510 A1 * | 9/2006 | Wang et al. ................... 708/200 |
| 2010/0191525 A1 * | 7/2010 | Rabenko et al. .............. 704/211 |

OTHER PUBLICATIONS

Brain Berscheid et al., "FPGA-Based DOCSIS Upstream Demodulation," University of Saskatchewan, Canada, 2011, pp. 1-182.*

* cited by examiner

*Primary Examiner* — Tesfaldet Bocure
(74) *Attorney, Agent, or Firm* — Adrian D. Battison; Ade & Company Inc.

(57) ABSTRACT

In a DOCSIS transmission network, it is necessary for an upstream receiver to estimate and correct for errors in the carrier frequency of the transmission based upon observations of a preamble sequence. This task is complicated by the fact that microreflections in the upstream channels cause intersymbol interference, which tends to bias the frequency estimation circuit. An economical, ISI-immune algorithm is provided for estimating the carrier frequency of upstream transmissions. The arrangement improves the reliability of the frequency estimates in the presence of ISI, thereby reducing the overhead and increasing the throughput of the upstream channels.

4 Claims, 4 Drawing Sheets

FREQUENCY OFFSET ESTIMATOR FOR UPSTREAM CABLE SIGNALS

This application claims under 35 USC 119 the benefit of priority from Provisional Application 61/383,810 filed Sep. 17, 2010.

This invention relates to a method of estimating the frequency offset of an RF or IF signal of an upstream cable signal.

BACKGROUND OF THE INVENTION

The DOCSIS (Data Over Cable Service Interface Specification) standards define a protocol governing the transmission of data over hybrid fiber-coax networks. In contrast to the broadcast model used in traditional analog television services, many modern communications applications supported by DOCSIS networks require two-way data transfer.

As described in more detail hereinafter, a modern cable network consists of two main classes of devices: Cable Modems (CM) and Cable Modem Termination Systems (CMTS). The CM is a low-cost, mass-produced device that is used by each customer to connect to the network, while the CMTS is a large and complex piece of equipment residing on the cable operator's premises. Traffic flowing from the CMTS to the CMs is known as downstream traffic. In contrast, the transfer of data from a single CM to the CMTS is referred to as upstream traffic.

Due to the recent explosion of two-way communications applications such as voice-over-IP and video conferencing, there is significant competition for bandwidth on the upstream channels. A time division multiple access scheme is generally used to share the upstream bandwidth between the multitude of CMs present on the network. Consequently, the data flowing on the upstream channels consists of a stream of short packets, each of which may be from a different CM. In order to properly receive these fragmented upstream transmissions, a burst demodulator is required in the CMTS.

In general, the task of the receiver in a communication system is complicated by a number of physical layer distortions which are commonly present in the communication signal. Such distortions generally arise from a lack of synchronization between transmitter and receiver, nonidealities in the transmission medium, or mismatches between the hardware components used to construct the transmitter and receiver. Unless compensated for in the receiver, these distortions tend to impair the performance of the communication system.

Accordingly, when a CM initially connects to the cable network, it is necessary for the upstream demodulator in the CMTS to estimate and correct for a number of physical layer parameters, including symbol timing error, carrier frequency error, symbol rate error, and channel attenuation. As is common in burst communication systems, DOCSIS upstream packets begin with a known preamble in order to facilitate this process. The preamble of a DOCSIS upstream packet is followed by a variable-length data segment, which contains the payload of the transmission.

In DOCSIS systems, the CMTS is responsible for dynamically defining the content and length of the preamble on a CM-by-CM basis. The receiver algorithms used during the synchronization process determine the number of preamble symbols required in each packet, thus having a significant impact upon the overall efficiency of the upstream channels.

The problem of estimating the carrier frequency of a burst digital signal has been well-studied over the last half-century or so. Rife and Boorstyn laid the groundwork for the field (as set out in Document 7 below) by deriving the Cramer-Rao bounds (CRB) and maximum likelihood estimators for the estimation of the amplitude, frequency, and phase of a single tone from discrete-time observations.

As set out in Document 8 below, Tretter showed that a statistically efficient estimator of the frequency of a noisy sinusoid may be generated using linear regression techniques. An alternative CRB-achieving scheme, proposed by Kay (as set out in Document 3 below), exploits the correlation between the phase of the incoming samples. Later, Luise and Reggiannini (as set out in Document 5 below) used maximum likelihood techniques to derive a cost-effective frequency recovery algorithm for high-SNR signals. One other notable estimator is that proposed by Mengali and Morelli in Document 7 below, which has the advantage of a particularly large estimation range.

The amount of published work in the area of frequency estimation specifically for DOCSIS upstream channels is relatively limited. As set out in Document 10 below, Wang and Speidel suggested a technique based upon the measurement of the phase angle of the output of a preamble detector. Most recently, Kim et al. (as set out in Document 4 below) surveyed the literature and concluded that Mengali and Morelli's technique is well-suited to the upstream channel.

Despite all of these results, DOCSIS upstream channels present one key issue which does not appear to have been given much attention in the literature: micro-reflections or 'echoes' (as set out in Document 1 below). Improperly terminated CMs in a DOCSIS network often reflect multiple copies of the transmitted upstream signals back to the CMTS. The result is significant intersymbol interference (151) in the received signal, which tends to have a biasing effect upon the previously discussed carrier frequency estimators.

The following documents provide further information on this subject:

[1] CableLabs. *Data Over Cable Service Interface Specifications DOCSIS 3.0-Physical Layer Specification*. CM-SP-PHYv3.0-103-070223, 2007.

[2] Golomb, S. and Scholtz, R. Generalized Barker sequences. *Information Theory, IEEE Transactions on*, 11(4): 533-537, 1965.

[3] Kay, S. A fast and accurate single frequency estimator. *Acoustics, Speech and Signal Processing, IEEE Transactions on*, 37(12):1987-1990, 1989.

[4] Youngje Kim and Hyunju Ha and Junseo Lee and Wangrok Oh and Whanwoo Kim and Eungdon Lee and Yun-Jeong Song. Upstream Channel Synchronization for Cable Modem System. *Advanced Communication Technology, The 9th International Conference on*, pages 1864-1867, 2007.

[5] Luise, M. and Reggiannini, R. Carrier frequency recovery in all-digital modems for burst-mode transmissions. *Communications, IEEE Transactions on*, 43(234):1169-1178, 1995.

[6] Mengali, U. and Morelli, M. Data-aided frequency estimation for burst digital transmission. *Communications, IEEE Transactions on*, 45(1):23-25, 1997.

[7] Rife, D. and Boorstyn, R. Single tone parameter estimation from discrete-time observations. *Information Theory, IEEE Transactions on*, 20(5):591-598, 1974.

[8] Tretter, S. Estimating the frequency of a noisy sinusoid by linear regression (Corresp.). *Information Theory, IEEE Transactions on*, 31(6):832-835, 1985.

[9] Volder, Jack E. The CORDIC Trigonometric Computing Technique. *Electronic Computers, IEEE Transactions on*, EC-8(3):330-334, 1959.

[10] Jianxin Wang and Speidel, J. Packet acquisition in upstream transmission of the DOCSIS standard. *Broadcasting, IEEE Transactions on,* 49(1):26-31, 2003.

[11] Berscheid, B., et al., Signal Equalizer for a Signal Transmission Network, U.S. patent application Ser. No. 12/815,611 filed Jun. 15, 2010.

All publications, patents, and patent applications mentioned in this specification are herein incorporated by reference to the same extent as if each individual publication, patent, or patent application was specifically and individually indicated to be incorporated by reference. The disclosures in the above documents can be considered for further details of any matters not fully discussed herein.

SUMMARY OF THE INVENTION

It is one object of the present invention to increase the efficiency of the upstream channels through the use of a fast-converging and robust carrier frequency recovery algorithm for use in a DOCSIS upstream receiver.

According to the invention there is provided a method of estimating the frequency offset of an RF or IF signal which has been downconverted to baseband comprising:

beginning each transmission with a signal preamble consisting of a sequence of symbols known to both transmitter and receiver;

utilizing the received version of this signal preamble in the receiver in order to calculate the frequency offset present in the transmission;

wherein the calculation is performed by constructing a composite estimator which is an average of the output of a series of elementary estimators;

wherein each of the elementary estimators makes use of only a subset of the total signal preamble;

and wherein the preamble subsets have the following characteristics:

all of the preamble subsets comprise a series of consecutive symbols;

all of the preamble subsets used by the elementary estimators must contain the same number M+1 of symbols;

no two preamble subsets may start or end on the same symbol.

In one implementation, each elementary estimator estimates the frequency offset by:

using a 1 symbol wide differential detector and angle computation device in order to determine the angular difference between each pair of symbols in the preamble subset;

and computing the average value of this angular difference.

In this implementation preferably the unbiased operation of the estimator in the presence of channel ISI is guaranteed by transmitting a sequence of signal preamble symbols which is periodic, where the period of the preamble symbols is M, which is one symbol less than the number of symbols in each of the preamble subsets.

In another implementation, each elementary estimator estimates the frequency offset by:

using an M symbol wide differential detector and angle computation device in order to determine the angular difference between the first and last symbol in the subset;

and dividing this angular difference by M.

The present invention therefore involves a novel algorithm for data-aided carrier frequency estimation in upstream cable channels. Due to its differential detector based structure, the algorithm is economical to implement, while still providing a high level of performance. An additional aspect of the invention includes a technique for mitigating the effects of upstream channel ISI through the selection of preambles matched to the circuit used for frequency estimation. This scheme improves the reliability of the frequency estimates in the presence of ISI, thereby reducing the overhead and increasing the throughput of the upstream channels.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 1:
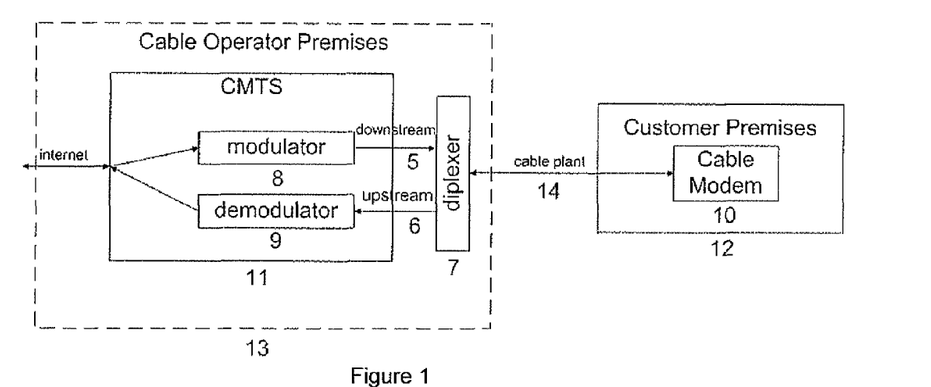
FIG. 1 is a high level overview of a cable network, illustrating the positions of the cable modem termination system and cable modems in the network.
Figure 2:
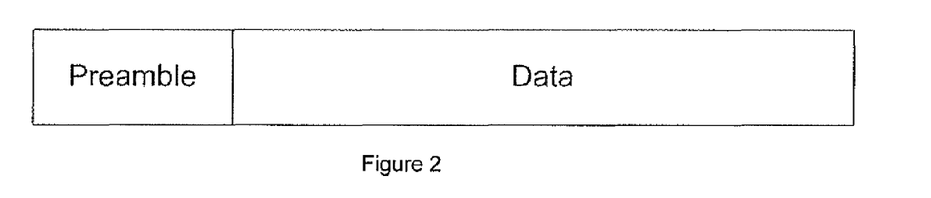
FIG. 2 shows the high-level structure of a physical layer DOCSIS upstream packet.

As shown in FIG. 1, the cable network includes a plurality of Cable Modems 10 at customer premises and a Cable Modem Termination System 11. The CM 10 is a low-cost, mass-produced device that is used by each customer 12 to connect to the network, while the CMTS 11 is a large and complex piece of equipment residing on the cable operator's premises 13. Traffic flowing from the CMTS to the CMs is known as downstream traffic. In contrast, the transfer of data from a single CM to the CMTS is referred to as upstream traffic. FIG. 2 shows the construction of a packet of data communicated from the CM 10 to the CMTS 11.

Figure 3:
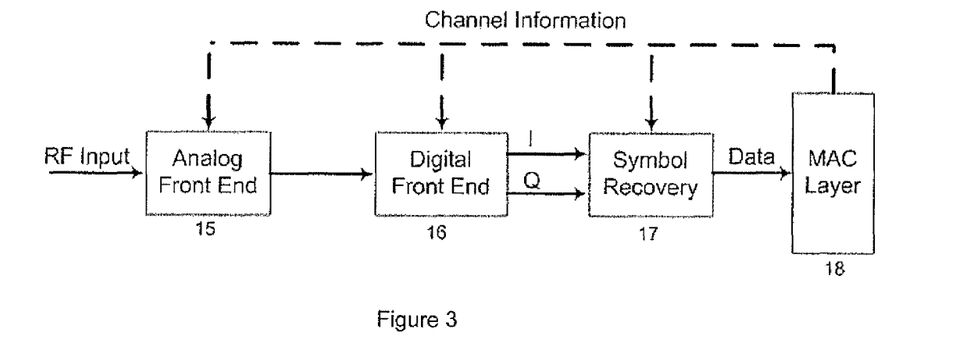
FIG. 3 is a block diagram showing the basic structure of an upstream receiver residing in the CMTS according to the present invention.

The high level structure of the DOCSIS upstream receiver 9 in which the present invention resides is shown in FIG. 3. As indicated in the figure, a radio frequency (RF) signal enters the receiver from the upstream output 6 from the diplexer 7. Inside the receiver, the signal is first passed to an analog front end module 15, which bandlimits the incoming signal through the use of analog filters in preparation for digitization. The filtered signal then enters a digital front end 16, which digitizes the incoming signal using an analog-to-digital converter (ADC). The resulting digital signal is then downconverted to baseband and optionally further filtered by the digital front end in order to attenuate any adjacent cable channels. The output of the digital front end is a complex baseband digital signal representing only the upstream channel of interest. This signal is then sent to the symbol recovery module 17, which is responsible for extracting the data payload from the upstream channel and sending the extracted data to the MAC layer 18. As shown in FIG. 3, the analog front end 15, digital front end 16, and symbol recovery modules 17 are all controlled by the MAC layer 18.

Figure 4:
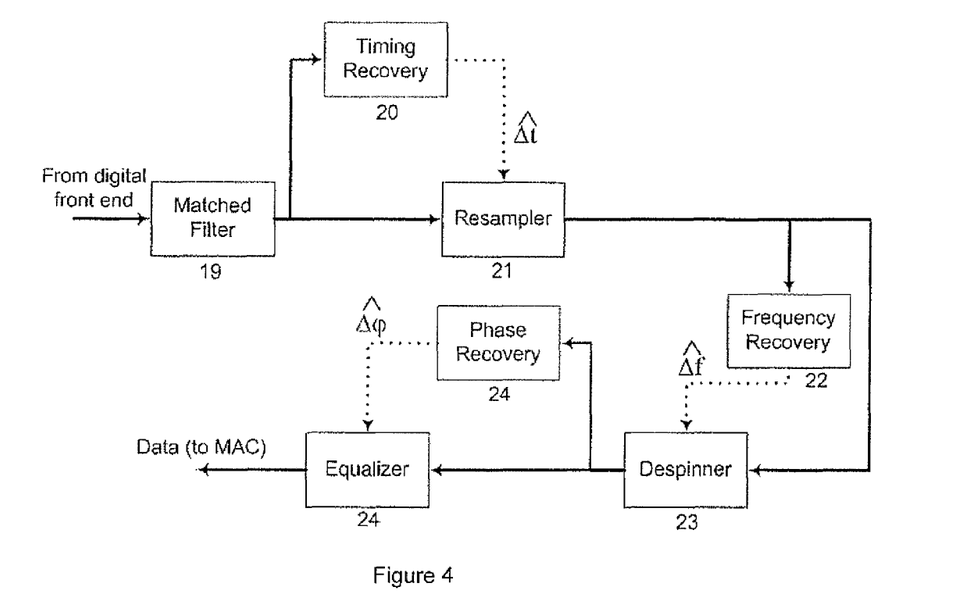
FIG. 4 is a block diagram showing the structure of the symbol recovery module in the demodulator of FIG. 3.

FIG. 4 provides a more detailed view of the symbol recovery module 17. Coming from the digital front end 16, a matched filter 19 is applied to the signal in order to increase the upstream channel's signal-to-noise ratio (SNR) and to minimize its ISI. The output of the matched filter 19 is sent to a timing recovery circuit 20 and resampler 21 which are responsible for ensuring that the samples of the digital signal passed to the subsequent blocks are synchronized to the transmitter's symbol clock. The resampled signal is passed to frequency recovery 22 and despinner modules 23, which estimate and correct for any mismatch between the upstream channel's actual and expected carrier frequencies. After the despinner module 23, the signal is sent to a phase recovery circuit 24 and an equalizer 25, which remove any residual phase error or ISI respectively. The equalizer 25 determines the sequence of transmitted payload symbols, then passes this data to the MAC layer 18 for higher-level processing.

The present invention relates to the algorithms and circuits used by the frequency recovery module 22 to estimate this mismatch. Data-aided algorithms for estimating the carrier frequency of a digital PAM or QAM signal typically operate upon the output of the receiver's matched filter after timing has been recovered, as in the demodulator shown in FIG. 4. Assuming for the moment that the timing has been recovered perfectly, the input to the frequency recovery module may be written as:

$$y[n] = a_n e^{j(\Delta\omega n + \phi_o)} + \eta_o[n]; 0 \leq n \leq N-1 \quad (1)$$

where $a_n$ is the transmitted complex symbol, $\Delta\omega$ is the frequency offset in units of radians/symbol, $\phi_o$ is an unknown phase offset, and $\eta_o[n]$ is a sample of a complex Gaussian noise process with variance $\sigma^2$. DOCSIS upstream packets utilize preamble symbols which are chosen from a QPSK constellation, so the symbols have a constant magnitude of $|a_n|=a$. According to the DOCSIS standard, the signal-to-noise ratio (SNR) of the upstream channel, which is equal to $$\frac{a^2}{\sigma^2},$$

is typically greater than 25 dB.

For SNRs greater than 25 dB, the additive white Gaussian noise of equation (1) above can be approximated by phase noise, as originally suggested by Kay in document 3 above. In doing so, the input signal to the frequency offset estimator may be modeled as:

$$y[n] \approx a_n e^{j(\Delta\omega n + \phi_o + \psi[n])} \quad (2)$$

where the phase noise $\psi[n]$ is a sequence of iid zero-mean Gaussian random variables with units radians and variances $1/(2SNR)$ radians$^2$. The use of this approximation greatly simplifies the analysis to follow.

The CRB is a theoretical lower limit upon the variance of any unbiased estimator. In document 7 above, the CR inequality for the variance of a frequency estimator operating upon N discrete-time observations of a complex sinusoid in the presence of white Gaussian noise was shown to be:

$$\text{var}(\hat{\Delta\omega}) \geq \frac{6}{N(N^2-1)SNR} \quad (3)$$

The Estimator Insight and Performance

Preamble-based frequency offset estimators typically operate by measuring the angular difference between a set of incoming symbols. Perhaps the most basic technique for observing these angular differences is known as the differential detector. In its simplest form, a differential detector multiplies its current input symbol by the complex conjugate of the immediately preceding symbol. Applying this simplest form of differential detection to the approximate frequency recovery input signal of equation (2) above yields:

$$y_{dd}[n] = y[n]y^*[n-1] \quad (4)$$
$$= a_n e^{j(\Delta\omega n + \phi_o + \psi[n])} a_{n-1}^* e^{-j(\Delta\omega(n-1) + \phi_o + \psi[n-1])}$$
$$= a_n a_{n-1}^* e^{j(\Delta\omega + \psi[n] - \psi[n-1])}$$

A very simple estimator of the frequency offset is given by the angle of $y_{dd}$. In practice, the angle is computed through the use of either a CORDIC atan circuit in document 9 above or a look-up table. Neglecting any error introduced by the angle computation device, this simple estimator may be expressed as:

$$\hat{\Delta\omega}_{n-1,n} = \hat{\Delta\omega}_{simple}[n] \quad (5)$$
$$= \arg(y_{dd}[n])$$
$$= \arg(a_n a_{n-1}^*) + \arg(e^{j(\Delta\omega + \psi[n] - \psi[n-1])})$$
$$= \arg(a_n a_{n-1}^*) + \Delta\omega + \psi[n] - \psi[n-1]$$

where the subscripts on $\hat{\Delta\omega}_{n-1,n}$ indicate that the inputs to the differential detector are symbols n−1 and n. The sequence of symbols is known during the preamble, so the contribution of $\arg(a_n a_{n-1}^*)$ can be removed. Since the sampling rate of sequences y and $y_{dd}$ is equal to the symbol rate, the units of the estimator given by equation (5) above are radians/symbol. Keeping in mind that the phase noise $\psi[n]$ is a sequence of iid random variables with mean and variance equal to 0 and $1/(2SNR)$ respectively, it is clear that the estimator of equation (5) above is unbiased and that the variance of $\hat{\Delta\omega}_{simple}[n]$ is equal to 1/SNR in units of (radians/symbol)$^2$.

In order to produce more precise estimates, one possible approach is to average M estimates from the simple estimator of equation (5) above, yielding the following estimator:

$$\hat{\Delta\omega}_{avg} = \frac{1}{M} \sum_{n=1}^{M} \hat{\Delta\omega}_{n-1,n} \quad (6)$$
$$= \frac{1}{M} \sum_{n=1}^{M} (\Delta\omega + \psi[n] - \psi[n-1])$$
$$= \Delta\omega + \frac{\psi[M]}{M} - \frac{\psi[0]}{M}$$

An alternative approach to improving the simple estimator is to use a differential detector with a larger differential delay of M symbols. Such an estimator can be expressed as:

$$\hat{\Delta}\omega_{n-M,n} = \hat{\Delta}\omega_{wide} \quad (7)$$
$$= \frac{1}{M}\arg(y[n]y[n-M]^*)$$
$$= \Delta\omega + \frac{\psi[M]}{M} - \frac{\psi[0]}{M}$$

Interestingly, this M-wide differential approach yields the same result as the M-averaging, 1-wide differential detector of equation (6). The estimators of equations (6) and (7) above produce the same output, so from a theoretical point of view, the M-wide differential and M-averaging 1-wide implementations may be used interchangeably. However, from an implementation perspective, they are quite different, as discussed later herein.

It is apparent from equation (6) above that the M-averaging estimator $\hat{\Delta}\omega_{avg}$ is an unbiased estimator and that its variance is $$\frac{1}{M^2 SNR},$$

which is lower than the variance of the simple estimator by a factor of $M^2$. Equation (6) also indicates that only the phase noise at symbols 0 and M are reflected in the estimator's output. This fact suggests that estimators which start and end on different symbols will produce independent estimates.

An N symbol preamble can be apportioned into N/2 (or (N−1)/2 for N odd) overlapping subsets, all of which start and end on unique symbols. Consequently, for an N symbol preamble, it is possible to construct a set of N/2 (or (N−1)/2 for N odd) independent elementary estimators, where each estimator operates upon one such subset. A composite estimator with lower variance can then be constructed by weighting and summing these N/2 or (N−1)/2 elementary estimators. By varying the way in which the preamble subsets are constructed, different sets of elementary estimators can be constructed for a given preamble length.

Figure 5:
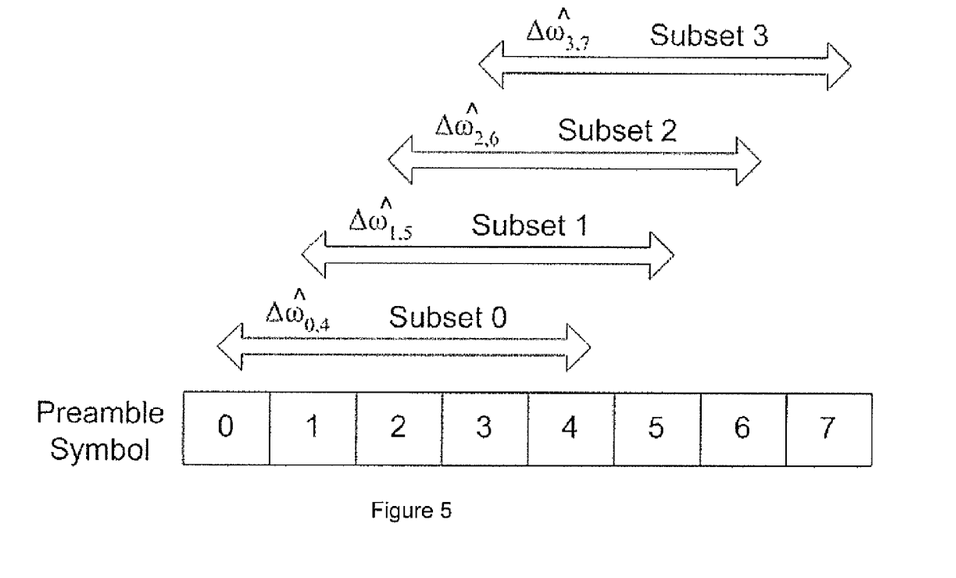
FIG. 5 shows a preamble partitioned into multiple subsets for use by elementary frequency estimators using the method according to the present invention.

One such possible set of estimators is shown in FIG. 5. These estimators are referred to as an equal average-length set of estimators. While this approach necessarily produces a composite estimator whose variance is higher than the CRB, it has a major advantage: the variance of each elementary estimator is equal, which reduces the hardware implementation cost by allowing for a uniform weighting of the elementary estimates. Consequently, for the general case of a composite estimator utilizing N−M independent elementary estimators of averaging length M, the composite estimator output may be expressed as:

$$\hat{\Delta}\omega_{eq\text{-}len} = \frac{1}{N-M}\sum_{i=0}^{N-M-1}\hat{\Delta}\omega_{i,M+i}; \quad (8)$$
$$\text{floor}\left(\frac{N+1}{2}\right) \leq M \leq N$$

where M is the averaging length of each elementary estimator, as before. The variance of this estimator can be shown to be:

$$\sigma^2_{eq\text{-}len} = \frac{1}{M^2(N-M)SNR} \quad (9)$$

The value of M that minimizes $\sigma_{eq\text{-}len}^2$ in the interval floor $$\left(\frac{N+1}{2}\right) \leq M \leq N$$

is $M_{opt}$=round(2N/3). For the case where N is divisible by 3, the variance of the composite equal average-length estimator becomes:

$$\sigma^2_{eq\text{-}avg\text{-}best} = \frac{1}{\left(\frac{2N}{3}\right)^2\left(N-\frac{2N}{3}\right)SNR} = \frac{27}{4N^3 SNR} \quad (10)$$

which is approximately 0.5 dB higher than the CRB. It could be argued that the simplicity of implementation more than compensates for the small performance penalty of 0.5 dB. However, the real value of this composite equal average-length estimator is not its economy, but that it produces unbiased estimates for ISI-laden channels.

The Effect of ISI

Figure 6:
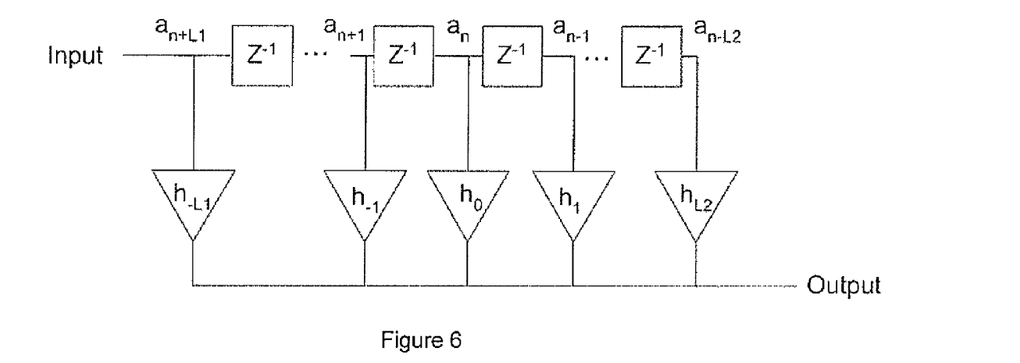
FIG. 6 illustrates the modeling of the effect of channel ISI as a symbol-rate linear filter showing the method according to the present invention

One of the major challenges posed by the DOCSIS upstream channel is the large amount of ISI typically present in the received signal. The main source of this ISI is multipath reception caused by micro-reflections in the cable network. According to the DOCSIS standard, these micro-reflections can be as large as 10 dB relative to the carrier, and may arrive up to seven symbol durations later than the main path. Error in the demodulator timing recovery circuit is another (although generally much less severe) possible source of ISI. From the perspective of the upstream frequency estimation algorithm, the ISI generated by these two sources may be modeled as a discrete-time linear filter with complex coefficients h running at the symbol rate, as illustrated in FIG. 6.

Figure 7:
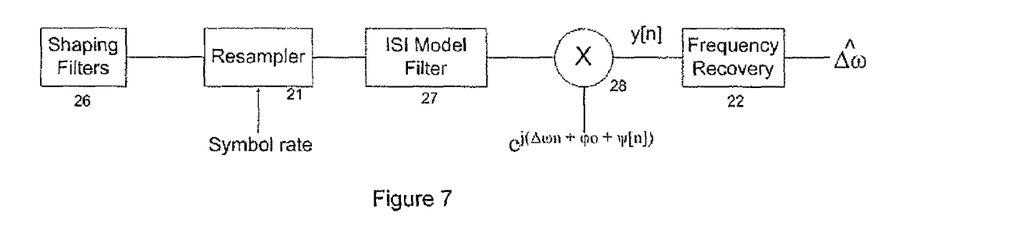
FIG. 7 is a high-level block diagram showing the model used to analyze the effects of ISI upon the frequency recovery algorithm

FIG. 7 provides a higher level view of the model used to analyze the effects of ISI upon the frequency recovery algorithm. In the model, the combined effect of the transmitter's shaping filter and receiver's matched filter are represented using a single filter 26. The output of this filter is passed to an ideal resampler 21, which samples the incoming signal at the symbol rate. The output of the resampler is passed to the ISI model filter 27, which is shown in detail in FIG. 6. The output of the ISI model filter is passed to a downconversion block 28, which inserts a frequency offset to the signal. Finally, the resulting signal is passed to the frequency recovery block 22, in which the present invention resides. According to the model presented in FIG. 7, the input signal to the frequency recovery module may be written as:

$$y_{ISI}[n] = (a_n \circledast h_n)e^{j(\Delta\omega n + \phi_o + \psi[n])} \quad (11)$$
$$= e^{j(\Delta\omega n + \phi_o + \psi[n])}\sum_{k=-L_1}^{L_2} h_k a_{n-k}$$

where $\circledast$ represents convolution and $L_1$ and $L_2$ represent the number of filter taps on each side of the main tap, which is $h_0$.

ISI present at the input to the frequency offset estimator typically has a significant negative impact upon the estimator's performance. Consider the output of a differential detector of differential width M in response to the input signal of equation (11):

$$y_{dd}[n] = y[n]y[n-M]^* \quad (12)$$

$$= e^{j(\Delta\omega M + \psi[n] - \psi[n-M])} \left( \sum_{k_1=-L_1}^{L_2} h_{k_1} a_{n-k_1} \right)$$

$$\left( \sum_{k_2=-L_1}^{L_2} h_{k_2} a_{n-k_2-M} \right)^*$$

$$= e^{j(\Delta\omega M + \psi[n] - \psi[n-M])}$$

$$\sum_{k_1=-L_1}^{L_2} \sum_{k_2=-L_1}^{L_2} h_{k_1} h_{k_2}^* a_{n-k_1} a_{n-k_2-M}^*$$

$$= B[n] e^{j(\Delta\omega M + \psi[n] - \psi[n-M])}$$

where the unwanted double sum terms in (12) have been defined as:

$$B[n] \equiv \sum_{k_1=-L_1}^{L_2} \sum_{k_2=-L_1}^{L_2} h_{k_1} h_{k_2}^* a_{n-k_1} a_{n-k_2-M}^* \quad (13)$$

In general, B[n] in equation (12) above is a complex number that scales and rotates the differential detector output on a symbol-by-symbol basis. Consequently, the frequency offset estimator acquires a channel-and-sequence-specific bias which is unknown at the time of transmission. In order for a frequency estimator based upon the differential detector output of equation (12) above to avoid this bias and work correctly, the argument of B[n] must be known.

Fortunately, the argument of B[n] is known if the preamble sequence is periodic with period M. In this case, $a_n = a_{n-M}$, allowing B[n] to be rewritten as:

$$B[n] \equiv \sum_{k_1=-L_1}^{L_2} \sum_{k_2=-L_1}^{L_2} h_{k_1} h_{k_2}^* a_{n-k_1} a_{n-k_2}^* \quad (14)$$

Due to the symmetry of (14), B[n]=B[n]*, which means that B[n] is real regardless of the channel ISI coefficients h, and therefore its argument is zero. By selecting a periodic preamble, it is possible to prevent ISI from biasing the frequency estimator.

Implementation Details

As shown in the previous section, it is possible to make any differential-based frequency offset estimator immune to the biasing effects of ISI through the selection of an appropriate preamble. However, what constitutes an appropriate preamble differs for various averaging algorithms.

Many of the well-known frequency offset estimators, including the Kay estimator, the Mengali and Morelli (M&M) estimator, and the Luise and Reggiannini (L&R) estimator are constructed out of a number of differential detectors of different lengths. With this type of structure, in order for the overall estimator to be unbiased, each of the elementary estimators must also be unbiased. This in turn requires the period of the preamble sequence to be a common factor of all of the averaging lengths. If the number of symbols in the preamble is even, this requirement forces the preamble to have a period of one symbol. On the other hand, if the number of symbols in the preamble is odd, the preamble must have a period of either one or two symbols. Either way, the number of possible preambles which produces unbiased estimators is extremely limited.

Being limited to the use of either a constant or alternating preamble is an unwelcome constraint in many applications, as such a preamble necessarily concentrates the transmitted energy at one or two discrete frequencies. Preambles of this type are not suitable for sounding a channel, as good channel sounding sequences distribute the transmitted energy evenly across the channel bandwidth. This means that reliable channel estimation can not be performed in parallel with the frequency estimation. It should also be mentioned that sequences which concentrate the transmitted energy at one or two frequencies magnify the ill effects of noise if the transmitted energy coincides with a dip in the channel magnitude response.

In contrast to these well-known estimators, the composite estimator allows for a great deal of choice in terms of preamble selection. Since the estimator is composed of a series of elementary estimators which each average the same number M of symbols, any preamble with a period of M symbols will produce ISI immunity. If, as is typical, M is chosen to be significantly greater than one, the number of available preambles which meet the ISI criterion is large, giving the system designer much more flexibility.

When constructing the composite estimator, a question arises: is it better to implement each of the elementary estimators using equation (6), which averages the arguments of M outputs from a 1-wide detector, or using equation (7), which utilizes the argument of a single M-wide detector? In general, a differential detector experiences a phase ambiguity if the magnitude of the angular difference between its inputs exceeds $\pi$ radians. If undetected, such a phase ambiguity has a catastrophic effect upon the generated frequency estimate. There are two main sources of angular difference between the input vectors: frequency offset and AWGN. Since the effects of frequency offset ambiguity error are dire, it is sensible to provide ample protection against AWGN by designing the system such that the magnitude of the angular difference caused by the maximum expected frequency offset does not exceed $$\frac{3\pi}{4}.$$

When an estimator is constructed using 1-wide differential detector outputs, the above condition implies that the maximum tolerable frequency offset is $$\Delta f = \frac{3R_s}{8}$$

in Hz. This very large estimation range is the main advantage of the averaging implementation.

In contrast, if the M-wide detector implementation of equation (7) is used, in order for the magnitude of the angular difference caused by the frequency offset to be less than $$\frac{3\pi}{4},$$

the frequency offset must not exceed $$\Delta f = \frac{3R_s}{8M}.$$

The frequency estimation range has been reduced by a factor of M with respect to that of the M-averaging implementation. However, the M-wide implementation is more economical, and is thus preferable for a given application, so long as the frequency estimation range is sufficient. For a given maximum frequency offset, the allowable differential widths are $$M \le \frac{3R_s}{8\Delta f}.$$

If the optimum value of M is used, then N is limited by $$N = \frac{3M_{opt}}{2} \le \frac{9R_s}{16\Delta f}.$$

There may be situations where N must be larger than $$\frac{9R_s}{16\Delta f}$$

to achieve the desired $\sigma_{eq-len}^2$. For these situations, there is an equivalent composite estimator that uses a differential width of $N-M_{opt}$,=round(N/3), which is half that of $M_{opt}$=round (2N/3). This compact estimator averages $M_{opt}$ outputs of an $N-M_{opt}$ wide differential detector and is given by:

$$\hat{\Delta\omega}_{eq-len} = \frac{1}{M_{opt}} \sum_{i=0}^{M_{opt}-1} \hat{\Delta\omega}_{i,N-M_{opt}+i} \qquad (15)$$

This estimator produces estimates identical to those of equation (8). Therefore its variance is given by equation (9) and also by equation (10) if N is divisible by three. With the compact estimator, the sequence length can be as large as $$N = \frac{9R_s}{8\Delta f}$$

before phase ambiguities arise.

The frequency offset of a DOCSIS 3.0 upstream channel is almost certain to be less than 1.5% of the symbol rate. This means that values of M as large as $$\frac{3}{8 \times 0.015} = 25$$

can safely be chosen. Therefore, if $\sigma_{eq-len}^2$ is sufficiently small for N≤37, $M_{opt}$=round(2N/3) can be used for M. In the event that a smaller variance is required, the variance $\sigma_{eq-len}^2$ can be further reduced by using $M=N-M_{opt}$ to allow values of N up to 75 symbols. In either case, it is desirable to make M as large as possible in order to facilitate channel estimation.

By using the estimator with an ISI-resisting periodic preamble, two frequency offset estimators which are very well-suited to the DOCSIS upstream channel have been produced.

Figure 8:
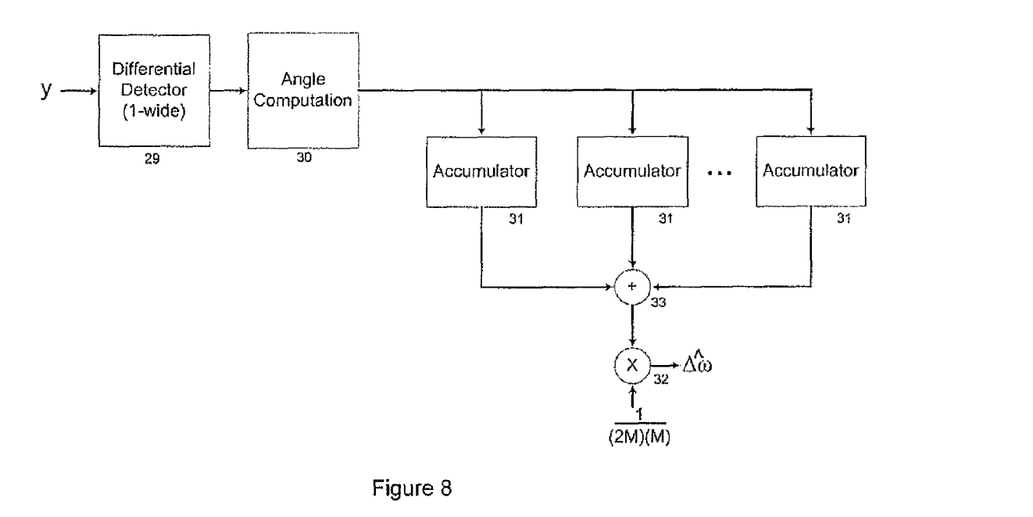
FIG. 8 illustrates a preferred embodiment of the frequency estimation technique using a differential detector of width 1 symbol according to the present invention.

The first preferred implementation, shown in FIG. 8, applies a 1-wide differential detector 29 to the incoming signal. The output of this differential detector is then fed into an angle computation circuit 30, such as a CORDIC. The resulting output is fed into a series of accumulators 31, each of which sums the samples corresponding to one of the preamble subsets. The outputs of these accumulators are then averaged using an adder 33 and scaling device 32 in order to produce the composite frequency estimate.

Figure 9:
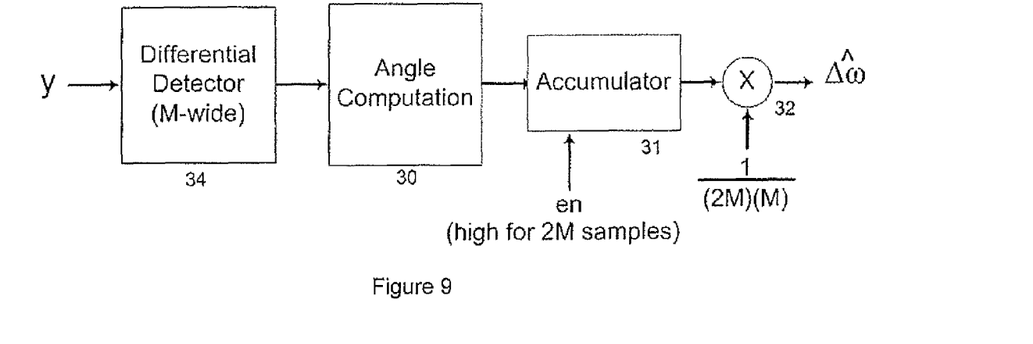
FIG. 9 illustrates a preferred embodiment of the frequency estimation technique using a differential detector of width M symbols according to the present invention.

The second preferred implementation, shown in FIG. 9, applies an M-wide differential detector 34 to the incoming signal. In this case, each sample from the differential detector's output corresponds to one of the elementary estimators. The output of this differential detector is once again fed into an angle computation circuit 30. The result is fed to an accumulator 31, and scaling device 32, which average the angular outputs from the elementary estimators, producing the composite frequency estimate.

The preferred implementations, shown in FIGS. 8 and 9, utilize a preamble of length 3M which is made up of three copies of an M-symbol sequence. Although any M-symbol sequence will mitigate the effects of ISI, a sequence which produces a relatively even spectral distribution of energy, such as a Barker sequence in document 2 above is recommended for channel estimation purposes.

The invention claimed is:

1. A method of estimating the frequency offset of an RF or IF signal which has been downconverted to baseband comprising:
    beginning each transmission with a signal preamble consisting of a sequence of symbols known to both transmitter and receiver;
    utilizing the received version of this signal preamble in the receiver in order to calculate the frequency offset present in the transmission;
    wherein the calculation is performed by constructing a composite estimator which is an average of the output of a series of elementary estimators;
    wherein each of the elementary estimators makes use of only a subset of the total signal preamble;
    and wherein the preamble subsets have the following characteristics:
        all of the preamble subsets comprise a series of consecutive symbols;
        all of the preamble subsets used by the elementary estimators must contain the same number M+1 of symbols;
        no two preamble subsets may start or end on the same symbol;
    wherein each elementary estimator estimates the frequency offset by:
        using a 1 symbol wide differential detector and angle computation device in order to determine the angular difference between each pair of symbols in the preamble subset;
        and computing the average value of this angular difference.

2. The method according to claim 1 wherein the unbiased operation of the estimator in the presence of channel ISI is guaranteed by transmitting a sequence of signal preamble symbols which is periodic, where the period of the preamble symbols is M, which is one symbol less than the number of symbols in each of the preamble subsets.

3. A method of estimating the frequency offset of an RF or IF signal which has been downconverted to baseband comprising:
- beginning each transmission with a signal preamble consisting of a sequence of symbols known to both transmitter and receiver;
- utilizing the received version of this signal preamble in the receiver in order to calculate the frequency offset present in the transmission;
- wherein the calculation is performed by constructing a composite estimator which is an average of the output of a series of elementary estimators;
- wherein each of the elementary estimators makes use of only a subset of the total signal preamble;
- wherein the preamble subsets have the following characteristics:
  - all of the preamble subsets comprise a series of consecutive symbols;
  - all of the preamble subsets used by the elementary estimators must contain the same number M+1 of symbols;
  - no two preamble subsets may start or end on the same symbol;
- and wherein each elementary estimator estimates the frequency offset by:
  - using an M symbol wide differential detector and angle computation device in order to determine the angular difference between the first and last symbol in the subset;
  - and dividing this angular difference by M.

4. The method according to claim 3 wherein the unbiased operation of the estimator in the presence of channel ISI is guaranteed by transmitting a sequence of signal preamble symbols which is periodic, where the period of the preamble symbols is M, which is one symbol less than the number of symbols in each of the preamble subsets.

* * * * *